(12) United States Patent
Yeke Yazdandoost et al.

(10) Patent No.: US 10,768,751 B2
(45) Date of Patent: Sep. 8, 2020

(54) ELECTRONIC DEVICE INCLUDING OPTICAL IMAGE SENSOR HAVING METALLIZATION LAYERS AND RELATED METHODS

(71) Applicant: Apple Inc., Cupertino, CA (US)

(72) Inventors: Mohammad Yeke Yazdandoost, San Jose, CA (US); Giovanni Gozzini, Berkeley, CA (US)

(73) Assignee: APPLE INC., Cupertino, CA (US)

( * ) Notice: Subject to any disclaimer, the term of this patent is extended or adjusted under 35 U.S.C. 154(b) by 311 days.

(21) Appl. No.: 15/987,543

(22) Filed: May 23, 2018

(65) Prior Publication Data

US 2018/0356915 A1 Dec. 13, 2018

Related U.S. Application Data

(60) Provisional application No. 62/518,858, filed on Jun. 13, 2017.

(51) Int. Cl.
*G06K 9/00* (2006.01)
*G06F 3/042* (2006.01)

(52) U.S. Cl.
CPC .......... *G06F 3/042* (2013.01); *G06K 9/0004* (2013.01); *G06K 9/00087* (2013.01); *G06F 2203/04103* (2013.01)

(58) Field of Classification Search
CPC .. G06K 9/0004; G06K 9/00087; A61B 5/681; G06F 21/32; G06F 3/0412
USPC ................. 382/115, 124, 103, 128
See application file for complete search history.

(56) References Cited

U.S. PATENT DOCUMENTS

| 8,989,348 | B2* | 3/2015 | Cox | G01N 23/04 378/146 |
| 9,829,614 | B2* | 11/2017 | Smith | G02B 27/58 |
| 10,438,046 | B2* | 10/2019 | He | G06K 9/001 |
| 2016/0132712 | A1* | 5/2016 | Yang | G06F 3/044 348/77 |
| 2018/0209844 | A1* | 7/2018 | Sun | H01L 27/14678 |

* cited by examiner

*Primary Examiner* — Charlotte M Baker
(74) *Attorney, Agent, or Firm* — Allen, Dyer, Doppelt + Gilchrist, P.A.

(57) ABSTRACT

An electronic device may include an optical image sensor that includes optical image sensing circuitry and metallization layers above the optical image sensing circuitry. Each layer may have at least one light transmissive collimation opening therein aligned with the optical image sensing circuitry. The electronic device may also include a light source layer above the optical image sensor and a transparent cover layer above the light source layer defining a finger placement surface configured to receive a finger adjacent thereto.

17 Claims, 5 Drawing Sheets

ELECTRONIC DEVICE INCLUDING OPTICAL IMAGE SENSOR HAVING METALLIZATION LAYERS AND RELATED METHODS

RELATED APPLICATIONS

The present application claims the priority benefit of provisional application Ser. No. 62/518,858 filed on Jun. 13, 2017, the entire contents of which are herein incorporated in its entirety by reference.

TECHNICAL FIELD

The present invention relates to the field of electronics, and, more particularly, to the field of optical image sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device. In other words, in some instances it may be undesirable to have a user perform an authentication in a separate authentication step, for example switching between tasks to perform the authentication.

SUMMARY

An electronic device may include an optical image sensor that includes optical image sensing circuitry and a plurality of metallization layers above the optical image sensing circuitry. Each layer may have at least one light transmissive collimation opening therein aligned with the optical image sensing circuitry. The electronic device may also include a light source layer adjacent the optical image sensor and a transparent cover layer above the light source layer defining a finger placement surface configured to receive a finger adjacent thereto.

The plurality of light transmissive collimation openings may have a cylindrical shape. The plurality of light transmissive collimation openings may have a frusto-conical shape, for example.

The optical image sensor may further include a passivation layer above the plurality of metallization layers. The optical image sensor may further include a plurality of inter-level dielectric layers respectively carrying each of the plurality of metallization layers, for example.

The optical image sensing circuitry may include an array of photodiodes and readout circuitry coupled thereto, for example. The light source layer may include a plurality of spaced apart light emitting diodes. The light source layer may include a display layer including a plurality of spaced apart display pixels.

The electronic device may also include an optically transparent adhesive layer between the light source layer and the optical image sensor. An optically transparent adhesive layer may be between the transparent cover layer and the light source layer, for example.

A method aspect is directed to a method of making an electronic device. The method may include forming an optical image sensor including optical image sensing circuitry, and a plurality of metallization layers above the optical image sensing circuitry, wherein each layer may be formed to have at least one light transmissive collimation opening therein aligned with the optical image sensing circuitry. The method may also include positioning a light source layer adjacent the optical image sensor and positioning a transparent cover layer above the light source layer to define a finger placement surface configured to receive a finger adjacent thereto.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to describe similar elements in different embodiments.

Figure 1:
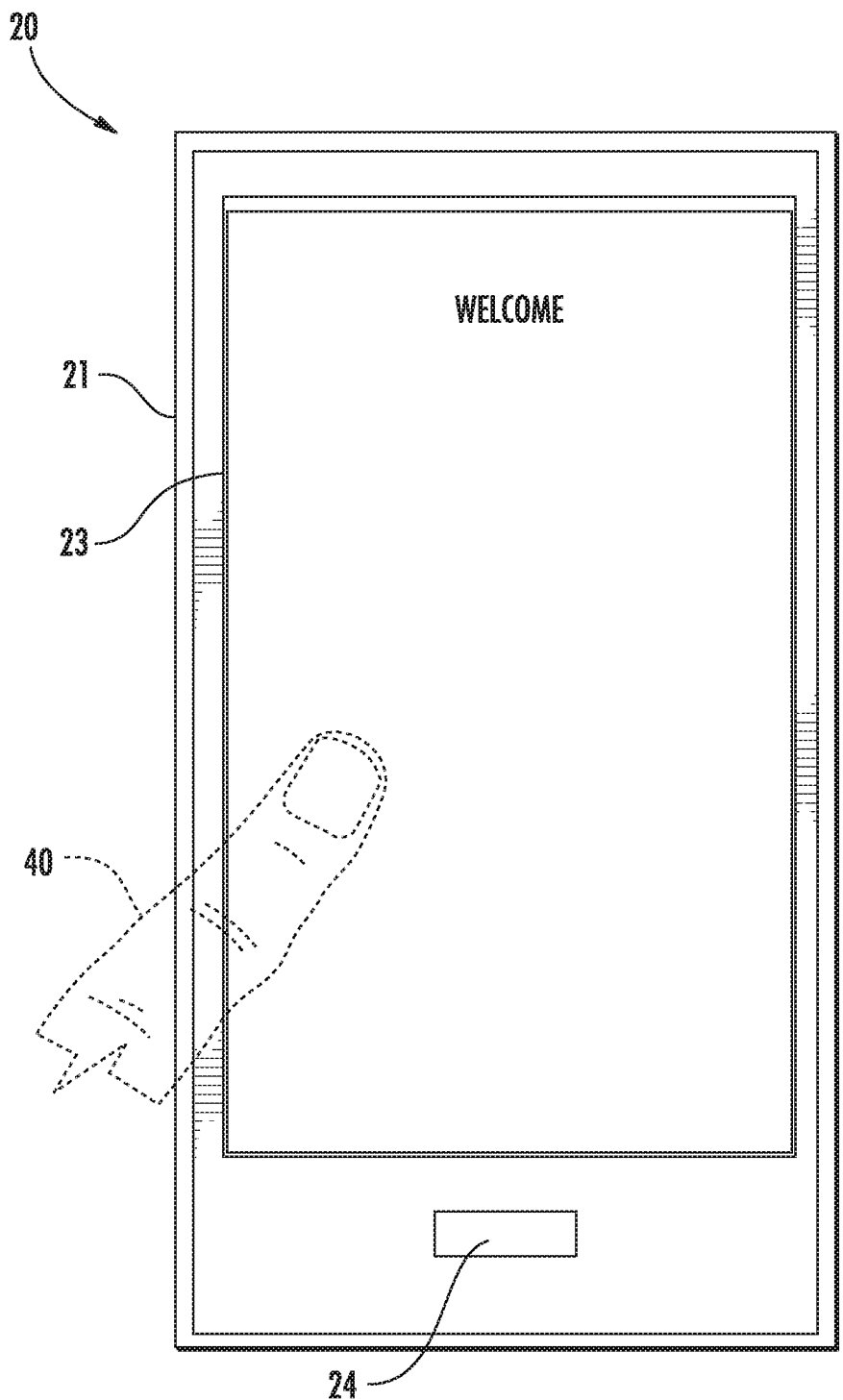
FIG. 1 is a plan view of an electronic device according to an embodiment.
Figure 2:
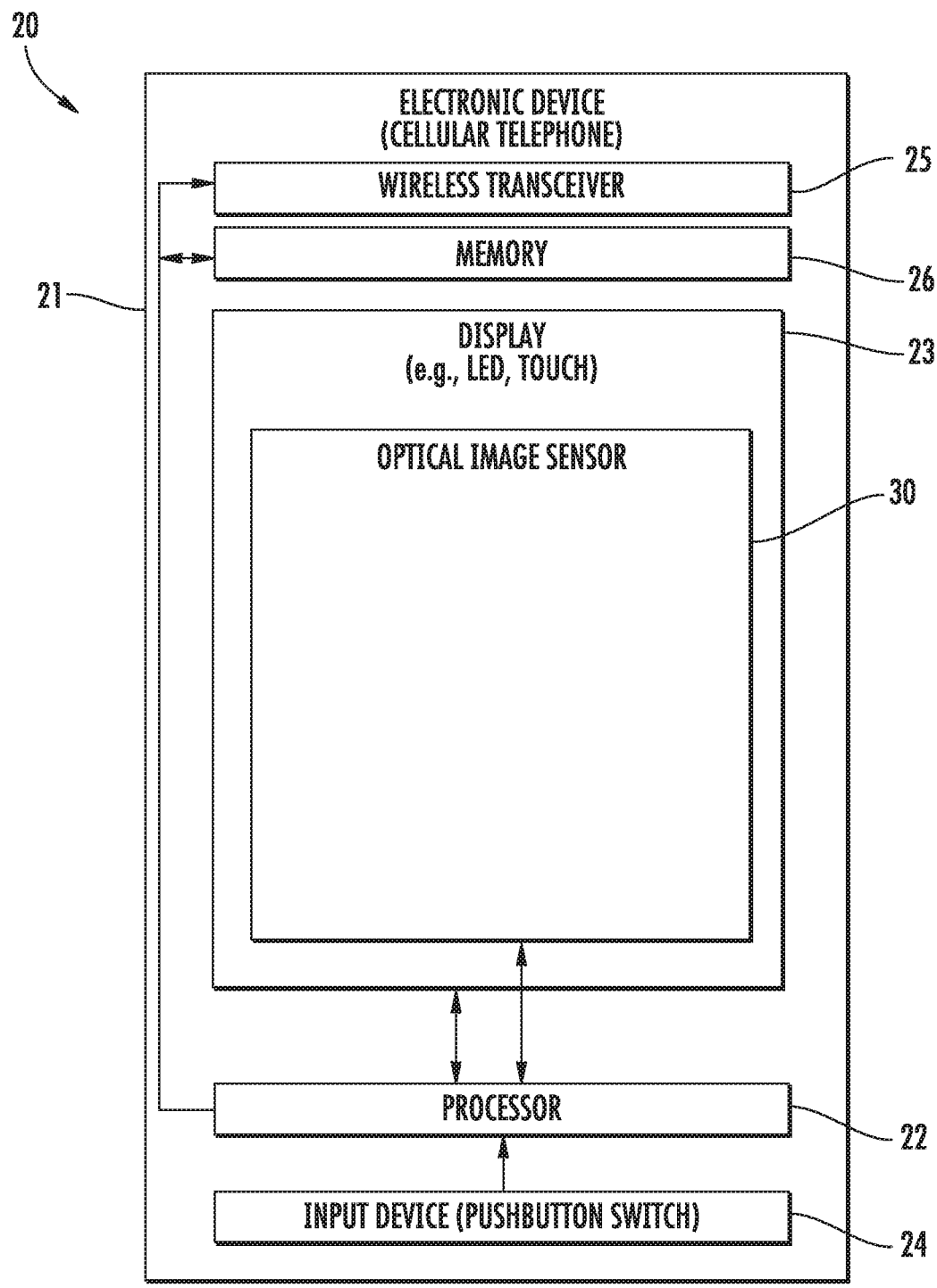
FIG. 2 is a schematic block diagram of an electronic device of FIG. 1.

Referring initially to FIGS. 1 and 2, an electronic device 20 illustratively includes a housing, for example, a portable housing 21, and a processor 22 carried by the portable housing. The electronic device 20 is illustratively a mobile wireless communications device, for example, a cellular telephone. The electronic device 20 may be another type of electronic device, for example, a tablet computer, laptop computer, wearable computer, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A display 23 is also carried by the portable housing 21 and is coupled to the processor 22. The display 23 may be a light emitting diode (LED) display, for example, and may have additional circuitry to provide touch display features, as will be appreciated by those skilled in the art. Further details of the display 23 are described below.

A memory 26 is also coupled to the processor 22. The memory 26 is for storing finger matching biometric template data, for example. The memory 26 may store other or additional types of data.

As will be appreciated by those skilled in the art, if the display 23 is in the form of a touch display, the touch display acts as both an input device and a display. As such, the display 23 would cooperate with the processor 22 to perform one or more device functions in response to input. For example, a device function may include a powering on or off of the electronic device 20, initiating communication via the wireless transceiver 25, and/or performing a menu function based upon input to the touch display.

More particularly, with respect to a menu function, the processor 22 may change the display 23 to show a menu of available applications based upon pressing or input to the touch display. Of course, other device functions may be performed based upon input to the touch display 23. Other or additional finger-operated user input devices may be carried by the portable housing 21, for example, a pushbutton switch 24, which may alternatively or additionally be used for device functions as will be appreciated by those skilled in the art.

Figure 3:
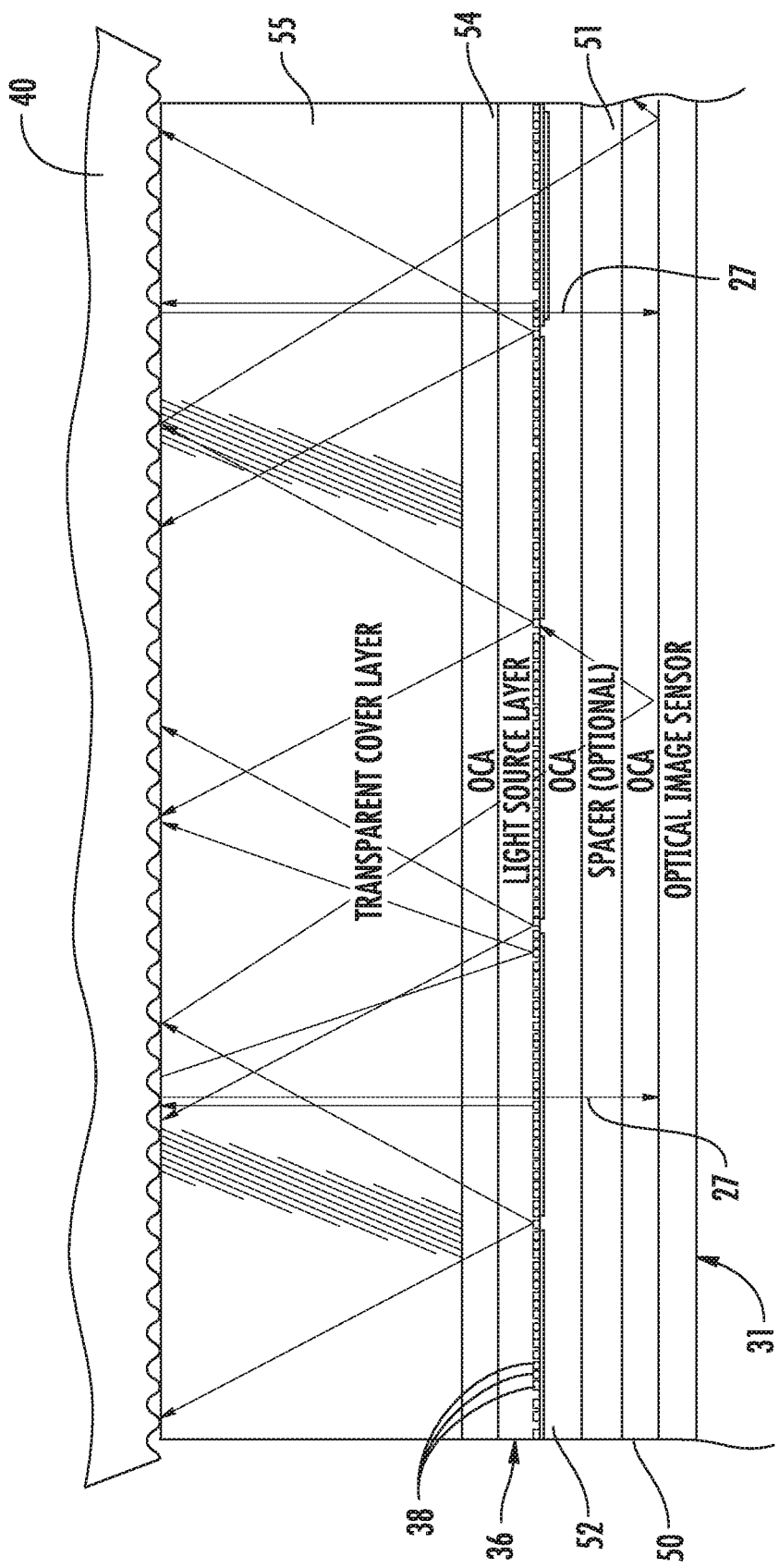
FIG. 3 is a schematic cross-sectional view of a portion of the electronic device of FIG. 1.
Figure 4:
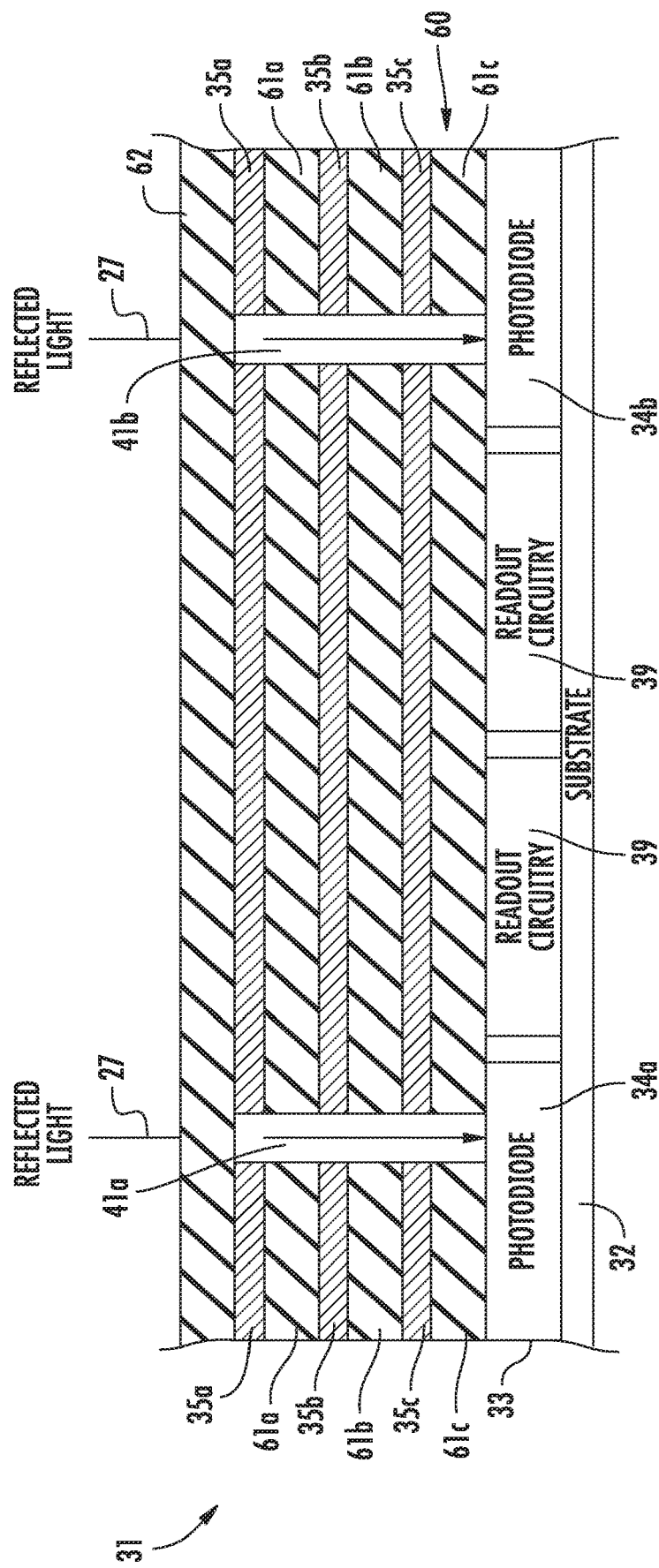
FIG. 4 is a more detailed schematic cross-sectional view of the optical image sensor of FIG. 3.

Referring now additionally to FIGS. 3 and 4, an optical image sensor 31 for sensing a biometric of a user, such as, for example, an image of the fingerprint patterns of the user's finger 40, is carried by the housing 21 under the display 23. More particularly, the optical image sensor 31 includes an integrated circuit (IC) substrate 32 and optical image sensing circuitry 33 carried by the IC substrate. The optical image sensing circuitry 33 may include an array of photodiodes 34a, 34b and readout circuitry 39 coupled thereto, as will be appreciated by those skilled in the art. The optical image sensor 31 may be a complementary metal oxide semiconductor (CMOS) image sensor or a thin film transistor (TFT) image sensor. Of course, the optical image sensor 31 may be another type of image sensor.

The optical image sensor 31 may be coupled to a circuit substrate, for example, a flexible substrate by way of a grid array having ball grid array (BGA) contacts or other coupling technique. The optical image sensor 31 may be a back-illuminated sensor or backside illumination (BSI) image sensor as will be appreciated by those skilled in the art.

The optical image sensor 31 also includes a collimation layer 60 that includes metallization layers 35a-35c or metal interconnect layers in a stacked arrangement above the optical image sensing circuitry 33. The collimation layer 60 also includes respective inter-level dielectric layers 61a-61c carrying the metallization layers 35a-35c. A passivation layer 62 is carried on a top surface of the optical image sensor 31, and more particularly, is carried by the collimation layer 60. While three metallization layers 35a-35c and corresponding inter-level dielectric layers 61a-61c are illustrated, it will be appreciated that more or less than three metallization layers and inter-layer dielectric layers may be included.

Each metallization layer 35a-35c and corresponding inter-level dielectric layers 61a-61c includes light transmissive collimation openings 41a, 41b therein having a cylindrical shape. Each light transmissive collimation opening 41a, 41b in a given layer is aligned with the optical image sensor 31, and more particularly, corresponding photodiodes 34a, 34b.

Exemplary dimensions for the optical image sensor 31 including the metallization layers 35a-35c is in the range of 100-300 microns.

Figure 5:
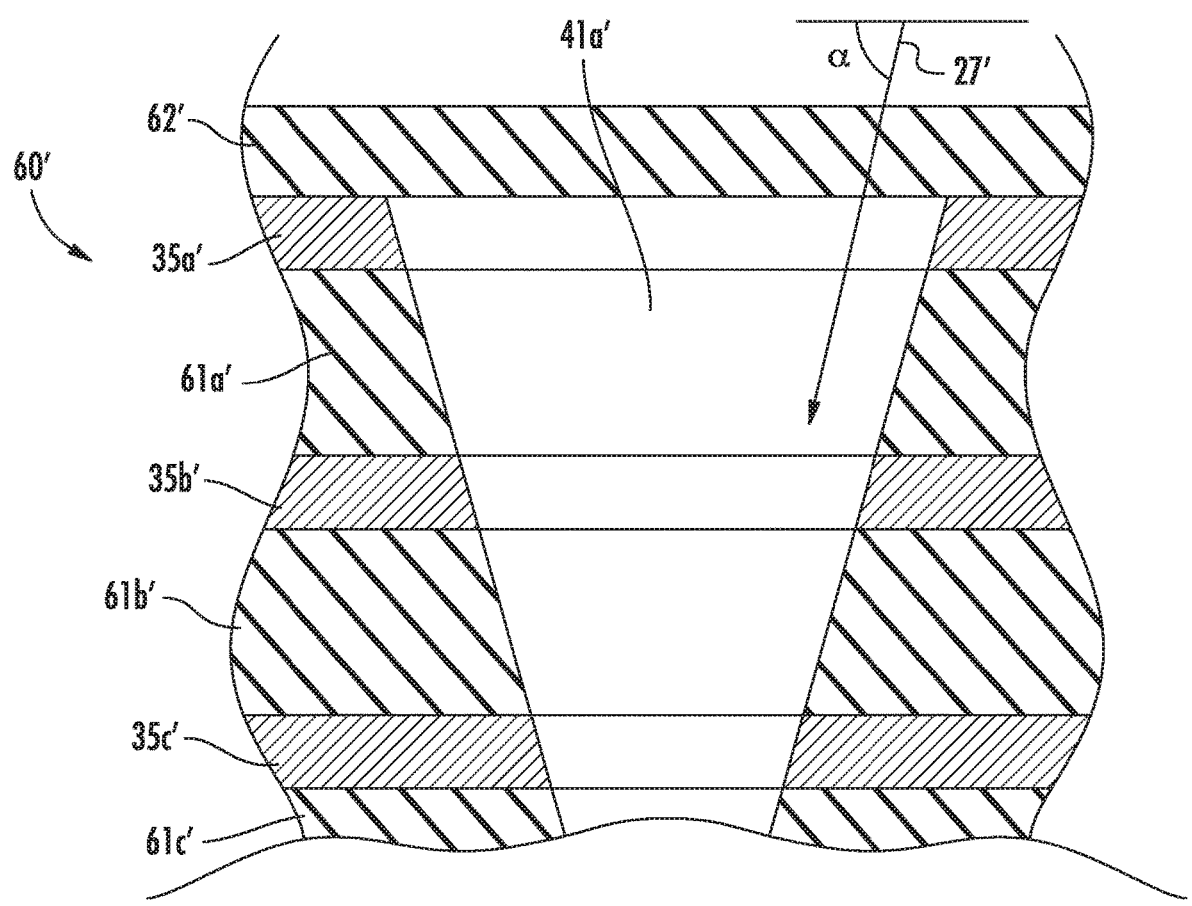
FIG. 5 is an enlarged schematic cross-sectional view of a portion of an optical image sensor according to another embodiment.

As will be appreciated by those skilled in the art, the collimation layer 60, including the metallization layers 35a-35c and inter-level dielectric layers 61a-61c, including the respective collimation openings 41a, 41b operate as an integrated collimator. The collimation layer 60 with cylindrical collimation openings 41a, 41b allows normal reflected light 27 (light reflected with a normal angle or at an angle relatively close to normal) to pass through the metallization layers 35a-35c and inter-level dielectric layers 61a-61c to the optical image sensor 31. In this way, the frustrated total internal reflection (FTIR) and other imaging techniques are filtered. Of course, the respective collimation openings 41a, 41b may be formed to permit reflected light at different angles other than normal to pass therethrough, for example, for different modes of operation. Referring briefly to FIG. 5, in some embodiments, the light transmissive collimation openings 41a' may have a frusto-conical shape to permit reflected light 27' that is reflected at a light acceptance angle α other than normal to pass through to the optical image sensor 31'. Of course, in other embodiments, the light transmissive collimation openings 41a, 41b may be another shape, such as, for example, polygonal, and/or more than one of the light transmissive collimation openings may have different shapes.

In some embodiments, the process of forming the metallization layers 35a-35c may be performed using a separate transparent substrate to be positioned on top of the optical image sensor 31. This means that the metallization or forming the metallization layers 35a-35c may be integrated in the fabrication process of the optical image sensor 31, as will be appreciated by those skilled in the art.

In some embodiments, other materials and processes can be used to form the collimation openings 41a, 41b with a more narrow field of view, such as, for example, patterned organic light blocking material and layers. These materials and layers can be also integrated with or be separated from the optical image sensor 31. The optically transmissive collimation openings 41a, 41b may be filled with or coated/plated with another material, for example, an optically transmissive material.

The collimation layer 60 including the metallization layers 35a-35c and inter-level dielectric layers 61a-61c may be formed in a way that specific reflected angles can be detected by the photodiodes 34a, 34b underneath. These angles may be different for each photodiode 34a, 34b. Moreover, more than one photodiode may correspond to a given opening in the metallization layers (e.g., at different angles), and/or more than one opening may correspond to a given photodiode.

A first optically clear adhesive layer 50 is above the optical image sensor 31. The first optically clear adhesive layer 50 may have a thickness in the range of about 100 microns, for example. The first optically clear adhesive layer 50 may have a different thickness, or a first optically clear adhesive layer may not be included at all.

An optional spacer layer 51 may be included above the first optically clear adhesive layer 50 and may have a thickness up to 200 microns. When the optional spacer layer 51 is used, a second optically clear adhesive layer 52 may be above the spacer layer 51 and have a thickness in the range of about 25-100 microns.

A light source layer 36 is adjacent the optical image sensor 31, and more particularly, above the optical image sensor. The light source layer 36 is above the first optically clear adhesive layer 50 (and when optionally implemented, the optional spacer layer 51 and second optically clear adhesive layer 52). The light source layer 36 may have a thickness in the range of 100-400 microns and may be part of the display 23 defining a display layer. When part of the display 23, the display layer 36 illustratively includes an array of display pixels 38, and/or micro-lenses for displaying images, as will be appreciated by those skilled in the art. In particular, the display layer 36 may be part of a light-emitting diode (LED) display, and more particularly, an organic LED (OLED) display. The LEDs or display pixels 38 may be spaced apart to allow light to pass through, and may be aligned with the light transmissive openings 41a, 41b in the collimation layer 60. Exemplary spacing of the LEDs or display pixels 38 may be about 500 pixels per inch (a 50-micron pixel size). In some embodiments, the display layer 36 may include an optically opaque mask layer, in which case portions of the mask layer may be removed to permit the passage of reflected light 27.

In some embodiments, the light source layer 36 may not be part of a display, and/or the light source layer may be in the same plane or different plane as the optical image sensor 31. For example, the light source layer 36 may be laterally adjacent the optical image sensor 31. Moreover, the electronic device 20 may optionally include one or more additional light sources that direct light into the user's finger 40, and may direct light for the optical image sensor 31. The additional light sources may be one or more light emitting diodes (LEDs) and/or may be part of the display layer 36. In other words, the display pixels 38 may be the light source and/or there may be a separate or additional light source. For example, different LEDs of the display may allow dynamic changing of and/or more flexibility with respect to the wavelengths of the light and the angle of illumination. A visible light source or invisible light source (e.g., infrared (IR) or ultraviolet (UV)), and/or another type of light source may be used, or a combination of light sources may be used.

A third optically clear adhesive layer 54 is above the light source layer 36. The third optically clear adhesive layer 54 may have a thickness in the range of about 5-100 microns, for example.

A transparent cover layer 55 is above the third optically clear adhesive layer 54 and has a thickness of about 1 mm. The transparent cover layer 55, or cover glass, defines a finger placement surface that receives the user's finger 40 adjacent thereto. As will be appreciated by those skilled in the art, images acquired by the optical image sensor 31 of the user's finger 40 may be matched by the processor 22 against stored images, for example, of a user's finger, for authentication.

A method aspect is directed to a method of making an electronic device 20. The method includes forming an optical image sensor 31 that includes optical image sensing circuitry 33 and metallization layers 35a-35c above the optical image sensing circuitry. Each layer is formed to have at least one light transmissive collimation opening 41a, 41b therein aligned with the optical image sensing circuitry. The method also includes positioning a light source layer 36 adjacent the optical image sensor 31 and positioning a transparent cover layer 55 above the light source layer to define a finger placement surface configured to receive a finger 40 adjacent thereto.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data, and further contemplates user restrictions on storing data in cloud-based services and/or restricting access to the same. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:
1. An electronic device comprising:
an optical image sensor comprising
   optical image sensing circuitry, and
   a collimation layer comprising
      a plurality of metallization layers above the optical image sensing circuitry, each layer having at least one light transmissive collimation opening therein aligned with the optical image sensing circuitry, and
      a plurality of inter-level dielectric layers respectively carrying each of the plurality of metallization layers;
a light source layer adjacent the optical image sensor; and a transparent cover layer above the light source layer defining a finger placement surface configured to receive a finger adjacent thereto.

2. The electronic device of claim 1 wherein the plurality of light transmissive collimation openings has a cylindrical shape.

3. The electronic device of claim 1 wherein the plurality of light transmissive collimation openings has a frusto-conical shape.

4. The electronic device of claim 1 wherein the optical image sensor further comprises a passivation layer above the plurality of metallization layers.

5. The electronic device of claim 1 further comprising an optically transparent adhesive layer between the transparent cover layer and the light source layer.

6. The electronic device of claim 1 wherein the optical image sensing circuitry comprises an array of photodiodes and readout circuitry coupled thereto.

7. The electronic device of claim 1 wherein the light source layer comprises a plurality of spaced apart light emitting diodes.

8. The electronic device of claim 1 wherein the light source layer comprises a display layer comprising a plurality of spaced apart display pixels.

9. The electronic device of claim 1 further comprising an optically transparent adhesive layer between the light source layer and the optical image sensor.

10. An electronic device comprising:
an optical image sensor comprising
optical image sensing circuitry comprising an array of photodiodes and a readout circuitry coupled thereto, and
a collimation layer comprising
a plurality of metallization layers above the optical image sensing circuitry, each layer having at least one light transmissive collimation opening therein aligned with the optical image sensing circuitry, the plurality of light transmissive collimation openings having a cylindrical shape, and
a plurality of inter-level dielectric layers respectively carrying each of the plurality of metallization layers;
a light source layer adjacent the optical image sensor; and
a transparent cover layer above the light source layer defining a finger placement surface configured to receive a finger adjacent thereto.

11. The electronic device of claim 10 further comprising an optically transparent adhesive layer between the transparent cover layer and the light source layer.

12. The electronic device of claim 10 wherein the optical image sensor further comprises a passivation layer above the plurality of metallization layers.

13. The electronic device of claim 10 further comprising an optically transparent adhesive layer between the light source layer and the optical image sensor.

14. A method for making an electronic device comprising:
forming an optical image sensor comprising optical image sensing circuitry, and a collimation layer, the collimation layer comprising a plurality of metallization layers above the optical image sensing circuitry, each metallization layer formed to have at least one light transmissive collimation opening therein aligned with the optical image sensing circuitry, and a plurality of inter-level dielectric layers, each inter-level dielectric layer formed to carry a respective one of the plurality of metallization layers;
positioning a light source layer adjacent the optical image sensor; and
positioning a transparent cover layer above the light source layer to define a finger placement surface configured to receive a finger adjacent thereto.

15. The method of claim 14 wherein the plurality of light transmissive collimation openings are formed to have a frusto-conical shape.

16. The method of claim 14 wherein forming the optical image sensor further comprises forming a passivation layer above the plurality of metallization layers.

17. The method of claim 14 wherein the plurality of light transmissive collimation openings are formed to have a cylindrical shape.

* * * * *